United States Patent [19]
Mochizuki et al.

[11] 4,333,130
[45] Jun. 1, 1982

[54] SLIT ILLUMINATING DEVICE

[75] Inventors: Noritaka Mochizuki, Yokohama; Atsushi Kubota, Komae, both of Japan

[73] Assignee: Canon Kabushiki Kaisha, Tokyo, Japan

[21] Appl. No.: 125,580

[22] Filed: Feb. 28, 1980

[51] Int. Cl.³ .......................... F21V 7/02; F21V 9/00; F21V 29/00; G03B 27/54

[52] U.S. Cl. ...................................... 362/293; 362/31; 362/32; 362/294; 362/297; 362/298; 362/302; 362/304; 362/346; 355/67; 355/71

[58] Field of Search ............... 362/293, 294, 297, 298, 362/302, 304, 31, 32, 346; 355/67, 71

[56] References Cited

U.S. PATENT DOCUMENTS 3,920,311 11/1975 Tsuda et al. ........................ 362/297
4,259,711 3/1981 Mochizuki .......................... 362/346

FOREIGN PATENT DOCUMENTS 53-140442 4/1977 Japan .

*Primary Examiner*—Benjamin R. Padgett
*Assistant Examiner*—Irwin Gluck
*Attorney, Agent, or Firm*—Fitzpatrick, Cella, Harper & Scinto

[57] ABSTRACT

A slit illuminating device of a compact size which is capable of performing effective illumination on an image original having a certain amount of thickness such as books, bound documents, etc., the surface of which slightly separates off an original image mounting table when it is placed thereon with its surface to be illuminated being faced down to the table, and which is also capable of uniformly illuminating a slit portion irrespective of slight positional displacement of a light source, whereby the image original can be broadly illuminated with divergent rays from an oblique lower direction in a substantially symmetrical manner.

17 Claims, 3 Drawing Figures

SLIT ILLUMINATING DEVICE

BACKGROUND OF THE INVENTION (a) Field of the Invention

This invention relates to a slit illuminating device suitable for reproducing an image original having a certain amount of thickness such as books, bound document, etc. used in a reproduction apparatus.

(b) Description of Prior Arts

Heretofore, illumination of a slit portion in the reproduction apparatus has mostly been done by focusing a light source image to the slit portion, as has already been known from FIG. 1 of U.S. Pat. No. 3,364,816. This method of illumination, however, has two problems. One is that, while the method effectively provides intense illumination to the slit portion, it brings about non-uniform illumination with respect to the slit having a limited amount of width, i.e., only the center part of the slit width, for instance, is intensely illuminated, while the side parts are less intensely illuminated, causing irregular luminance distribution. The other problem is that errors in manufacturing and fitting of each component elements in the illuminating device greatly affect the luminance distribution at the slit portion. For example, when the center position of the light source gets off its regular position, the luminance distribution at the slit portion varies to spoil its stability. To solve such disadvantage, there has been proposed a mechanism which broadly irradiates the slit portion with a converging light beam, as has been known from U.S. Pat. No. 3,982,116, whereby uniform luminance distribution can be obtained at the slit portion. While method of illumination does not cause the positional displacement of the light source to largely affect the luminance distribution at the slit portion, it is not so effective for illuminating an image original having a certain amount of thickness such as thick books, etc. The reason for this is that, when the thick book is opened and a page therein to be illuminated is placed on an image original mounting table with its page being faced down thereon to, the portion of the page near the bound side of the book slightly separates off the image original mounting table with the consequence that, when the slit portion is broadly illuminated with convergent light rays, the bound portion of the book is illuminated in only a narrow region.

Generally, a light beam which illuminates the slit portion direct from the light source and a light beam which is projected into the third reflecting mirror direct from the light source and reflected by the reflecting mirror to illuminated the slit portion are rendered deverging light rays. A Japanese Utility Model Patent Application Laid Open No. 53-140442 discloses an art, in which such direct light is taken into consideration in the luminance distribution at the slit portion. Besides the abovementioned two direct light beams, there are two other light beams, i.e., a light beam which emits from the light source and is reflected by a lower reflecting mirror to directly illuminate the slit portion and a light beam which emits from the light source, is reflected by an upper reflecting mirror, and is again reflected by third reflecting mirror to illuminate the slit portion, both of which form an image at the slit portion. The points of problem in the image forming illumination method with these light beams are as mentioned in the foregoing.

In case an image original having a certain amount of thickness such as thick books, etc., is illuminated it is desirable that these four light beams, including the direct light beams, be all divergent light rays for the broad illumination of the slit portion. The present invention has materialized this concept.

SUMMARY OF THE INVENTION

It is therefore a primary object of the present invention to provide a slit illuminating device suitable for illuminating an image original having a certain amount of thickness such as books, etc., and which permits slight positional displacement of a light source.

The abovementioned object of the present invention can be attained by adopting a device construction, in which a reflected light beam from a lower reflecting mirror partially surrounding a light source is rendered divergent light rays to illuminate a slit portion from an oblique lower direction, while a reflected light beam from an upper reflecting mirror partially surrounding the light source is once converged before it reaches a third reflecting mirror, is reflected by the third reflecting mirror when the converged light beam reaches there, and the reflected light beam from the third reflecting mirror which has been rendered divergent light rays broadly illuminates the slit portion from an oblique lower direction in symmetry with the reflected light beam from the lower reflecting mirror, whereby the symmetrical illuminating light beams may be mutually overlapped within a required range in the direction of the depth which is perpendicular to the slit portion.

DESCRIPTION OF PREFERRED EMBODIMENTS

Figure 1:
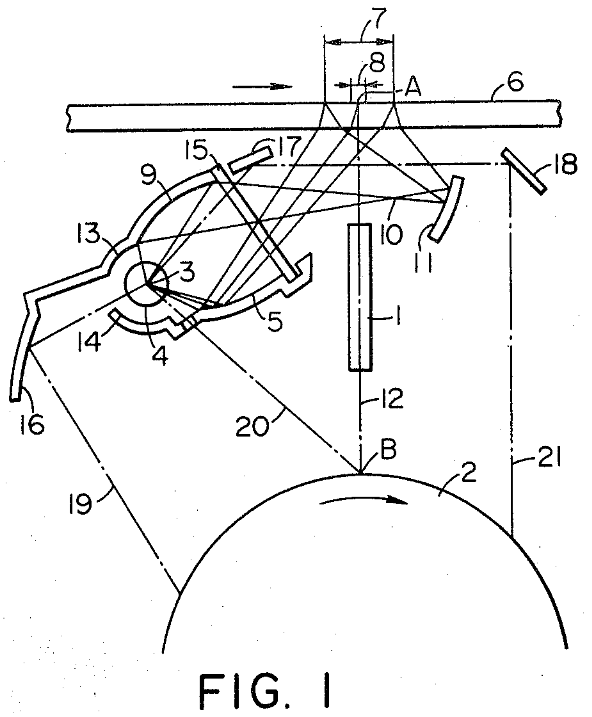
FIG. 1 is a schematic diagram for explaining one embodiment of the illuminating device according to the present invention.

Referring to FIG. 1 which illustrates the first embodiment of the present invention, a reference numeral 1 designates a lens to project a point A on an image original surface 6 to a point B on a moving photosensitive body 2. The lens 1 is fixed, and an image original is slit-projected onto the photosensitive body 2 moving in an arrowed direction by movement of the image original surface 6 in an arrowed direction.

The lens 1 is of a compound eye lens system, as disclosed in U.S. patent application Ser. No. 889,404, composed of a lens having a long length along its optical axis in comparison with an effective lens diameter (hereinafter simply called "bar lens"), or a short focus image forming element array such as light converging optical fiber (sold under a trade name of "CELFOCK"), as disclosed in U.S. Pat. No. 3,584,952 and U.S. Pat. No. 3,658,407, the refractive index of which gradually decreases radially and parabolically from its center toward its outer periphery. The resulting image is of an erecting image system. A numeral 3 refers to a filament part of a light source. 4 refers to a bulb as the light source, which is ordinarily transparent. As another embodiment, the surface of the bulb may be rendered the so-called "frost surface" with its surface being processed in milky-brown to scatter light. When the bulb 4 is transparent in its surface, the light source becomes a spot light source in its cross-section. When the bulb has the frost surface, however, the light source becomes a uniform light source having a size of the bulb 4 per se. A numeral 5 refers to a lower reflecting mirror which is made up of a plurality of flat surface mirrors, an envelope plane joining the center points in the flat surface mirrors forming an elliptic cylindrical surface. The first focal point of this enveloping ellipse is at a position of the filament 3, while its second focal point is at the position A on the image original 6. In more detail of the light rays emitting from the filament 3, those reflected from the center points which are in contact with the ellipse in the flat surface mirrors of the lower reflecting mirror 5 gathers on the point A. However, since the lower reflecting mirror 5 is constructed with a plurality of flat surface mirrors, the light rays reflected by the flat surface mirrors illuminate the slit portion in the state of divergent light rays without being converged. As the result of this, the divergent light rays from each and every flat surface mirror are overlapped as a whole at a region 7 which is broader than a slit width 8, whereby the luminance distribution in the slit width 8 becomes uniform in the region 7 which is broader than the slit width with the point A as its center. The slit width 8 is a required width to be illuminated on the image original. Incidentally, it has been mentioned in the foregoing that the enveloping elliptical surface joins the center points of the flat surface mirrors, but it may also be the surface joining any arbitrary one point on each of the flat surface mirrors. An upper reflecting mirror 9 consists of a part of the ellipse, having its first focal point at a position of the filament 3, its second focal point at a position of a point 10 in front of a third reflecting mirror 11 in the light path. In other words, of the light rays emitting from the filament 3, all the light rays reflected by the upper reflecting mirror 9 converge on the point 10. The position 10 of the second focal point may be just on the upper optical axis of the lens 1. The third reflecting mirror 11 is a cylindrical surface mirror and constitutes a part of a circle in its cross-section. The light rays reflected by the upper reflecting mirror 9 converge on the point 10, after which they are rendered a divergent light rays to enter the third reflecting mirror 11. After the divergent light rays are reflected by this third reflecting mirror 11, the degree of divergence is relaxed to some extent, and the reflected light rays illuminate substantially the entire part of the region 7 with the point A on the image original surface 6 as the center to give uniform luminance distribution to the slit portion. In this manner, a region broader than the slit width 8 is irradiated obliquely from both sides of the optical axis on the image original surface 6.

A reflecting area and a reflective power of the lower reflecting mirror 5, the upper reflecting mirror 9, and the third reflecting mirror 11 are so adjusted that luminance of light obliquely irradiated from both sides of the optical axis 12 at the slit portion may become mutually and substantially equal in amount. Incidentally, the third reflecting mirror 11 may be a flat surface mirror, instead of being the cylindrical surface mirror. In this case, the degree of divergence of the light rays before they are reflected by the third reflecting mirror 11 is maintained as it is even after the reflection. Reflecting mirrors 13, 14 are the cylindrical surface mirrors to return the light rays after the reflection to the light source, from which they are emitted. They are also auxiliary mirrors to effectively utilize the light quantity, and are effective for warming the light source.

A reference numeral 15 designates a heat preventing or wavelength selecting filter, 16, 17 and 18 respectively refer to a pre-exposure mirror and whole surface exposure mirrors in the process steps to be described later, 19 a pre-exposure light beam, 20 a blank exposure light beam, and 21 a whole surface exposure light beam. Since the image original surface 6 is irradiated from both sides of the optical axis 12 with a required irradiating width, i.e., with a region broader than the slit width 8, the illuminating width can be maintained in a substantially constant quantity, even when errors exist in manufacturing the lower reflecting mirror 5, the upper reflecting mirror 9 and the third reflecting mirror 11, or a relative position between the lower reflecting mirror 5 or the upper reflecting mirror 9 and the light source is displaced from its regular position, whereby sufficiently uniform illumination can be always done with a required slit width 8 only with the position being displaced to the left or right on the image original surface 6. Further, the light beam which has been emitted from the light source, reflected by the upper reflecting mirror 9, further reflected by the third reflecting mirror 11, and proceeds toward the slit portion, and the light which has been emitted from the light source, reflected by the lower reflecting mirror 5, and directly proceeds toward the slit portion are both rendered divergent light rays to be suitable for irradiating the image original having a certain amount of thickness such as books, etc. In other words, effective illumination can be done without the image original at the bound portion of the book causing undesirable shading.

Figure 2:
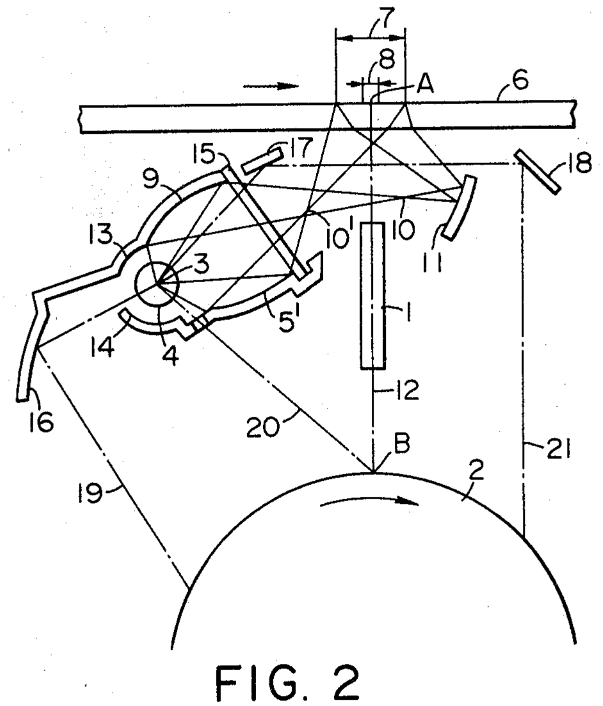
FIG. 2 is also a schematic diagram for explaining the second embodiment of the present invention.

In the following the second embodiment of the present invention will be explained in reference to FIG. 2. This embodiment differs from the first embodiment only in respect of the lower reflecting mirror. In the drawing, a reference numeral 5' designates the lower reflecting mirror forming a part of an ellipse, the first focal point of which is at the center of the light source, and the second focal point of which is on the point 10' in front of the slit portion in the light path. Light beams entering into the lower reflecting mirror 5' from the filament 3 all converge on the point 10', after which they are rendered divergent light rays to illuminate the slit portion with a wider region than the slit width with the point A on the image original surface 6 as its center, whereby uniform luminance distribution can be obtained within the slit width 8. The effect of the wide illumination with the divergent light rays is the same as that already explained in the first embodiment.

Figure 3:
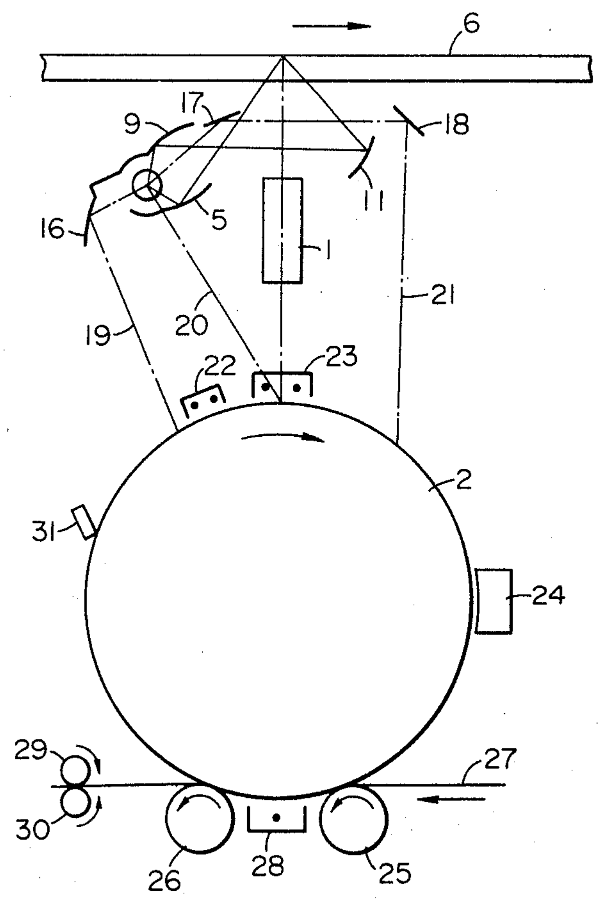
FIG. 3 is a schematic diagram for explaining a case, in which the slit illuminating device of the present invention is incorporated in a reproduction apparatus.

In the following, explanations will be given in reference to FIG. 3 as to a process, wherein the present invention is applied to a reproduction apparatus.

The moving photosensitive member 2 consists of, from its outer surface inward, a transparent insulating layer, a photoconductive layer, and an electrically conductive base layer.

The moving photosensitive member 2 is subjected to uniform electric charging on its surface by a corona discharger 22, the polarity of which is positive (+) when the photoconductive body is an N-type semiconductor, and negative (−) when it is a P-type semiconductor.

The moving photosensitive member 2 is then subjected to an image exposure through the lens 1, and, at the same time, to charge-removing action by an a.c. corona discharger 23 (or a corona discharger of the opposite polarity to that of the corona discharger 22), whereby a charge pattern corresponding to a light image of the image original is formed on the moving photosensitive member 2. Then, this moving photosensitive member 2 is subjected to a uniform overall exposure on its whole surface by a whole exposure light beam 21, whereby there is formed an electrostatic latent image having satisfactory image contrast. The thus formed latent image is developed as a toner image by a developing device 24 of cascade type, magnet brush type, and so forth. Subsequently, the toner image image-transferred onto an image transfer paper 27 which is sent out of a feeding means (not shown), is brought in contact with the moving photosensitive member 2 by means of rollers 25, 26, and is forwarded at an equal speed to that of the moving photosensitive member 2. With a view to increasing the image transfer efficiency, a charge in the opposite polarity to that of the toner which has formed the developed image is imparted to the rear surface of the image transfer paper 27 at the image transfer position.

This is done by a corona discharger 28. The toner image which has been transferred onto the image transfer paper 27 is fixed by an appropriate image fixing device such as heating fixer, etc. provided with a pair of roller 29, 30 which are press-contacted to the image transfer paper, after which the paper is conveyed to a receiving tray (not shown).

At the end of the image transfer operation, the surface of the photosensitive member is subjected to cleaning of residual toner thereon by an edge of a cleaning blade 31 press-contacting to the surface so that it may be reinstated to a clean surface to be ready for the subsequent image processing cycle. Although the abovementioned a.c. corona discharger 23 is so disposed that it may perform charge removal from the surface of the moving photosensitive member 2 simultaneously with the light image exposure, it may also be disposed between the corona discharger 22 and the image forming system so that the charge removal may be effected from the surface of the moving photosensitive member 2 prior to the light image exposure. In this case, the whole exposure light beam 21 is not necessary. Further, the moving photosensitive member 2 may be such that it has no surface insulating layer. In this case, both a.c. corona discharger 23 and the whole exposure light beam 21 are not required. Incidentally, the pre-exposure light beam 19 is to irradiate light onto the photosensitive layer prior to the primary charging of the first copy sheet to reduce resistance in the photosensitive layer so that it may have an equal resistance to that in the second copy sheet. The reason for this pre-exposure is that, since the material such as CdS, etc. constituting the photosensitive layer increases its resistance when it is left in a dark place, which resistance does not lower sufficiently by an exposure with a certain definite light quantity, hence the photosensitive layer is difficult in the charge removal, and the charge remains even on the white portion of the first copy sheet after it is left for a certain definite time (10 to 15 seconds) or longer to cause the entire image to become blackish. Further, the blank exposure light beam 20 is for the following purpose. That is, even when a light image for the latent image formation is not projected the developer 24 is operated, by movement of the photosensitive member. On account of this, if no appropriate illuminating light is projected onto the moving photosensitive member 2 at the light image exposing part etc., there would occur such a situation that the developer adheres onto the entire surface of the moving photosensitive member in solid black. Since this developer is not transferred, it must be removed completely with the cleaning device. Then, the load imposed on the cleaning device increases, which not only, hinders sufficient cleaning operation, but also shortens the life of the cleaning device as well as rapidly increases scattering quantity of the developer within the reproduction apparatus to cause troubles in the apparatus. Moreover, since the quantity of the developer supplied from the developer 24 increases, the density of the developer in the developer 24 abruptly lowers, and, at the same time, a device for returning the developer from the cleaning device to the developer becomes inevitably large in size. Therefore, in order to solve such inconvenience, an appropriate timing is taken, even when the photosensitive member is in operation under no light image projecting condition, to impart a substantially uniform illuminating light to the photosensitive member at a position at least before the developing section, such as light image exposure section, so that the blank exposure light beam 20 may be irradiated onto the moving photosensitive member 2 only when there is no image exposure.

In the abovementioned first embodiment, it has been mentioned that the lower reflecting mirror 5 consists of a plurality of flat surface mirrors to enable the image original surface 6 to be illuminated broader than the slit width 8, and that the second focal point of the envelope ellipse joining the center points of the flat surface mirrors is at the point A on the image original surface 6. It may, however, be permissible that the second focal point of this envelope ellipse be in front of the point A in the light path, or in the inner side of the point A in the light path, because, in either case, the light beam from the lower reflecting mirror 5 broadly illuminates the image original surface as a whole broader than the slit width with the diverging light beam.

Also, as to the upper reflecting mirror 9 in the aforedescribed first and second embodiments, it has been mentioned that the second focal point is in the vicinity of the upper part of the lens 1. Again, it is possible that the second focal point be on the plane of the third reflecting mirror 11 or behind it. Further, although the light beam width becomes wider above the lens 1, the image original surface can be illuminated with the diverging light beam even in a construction, wherein the upper reflecting mirror 9 is composed of a plurality of flat surface mirrors same as the lower reflecting mirror 5, the envelope plane joining one point on the flat surface mirrors forms the elliptic cylindrical surface, and the first focal point thereof is at the light source position. In this case, the second focal point of the envelope ellipse may be either in front of the third reflecting mirror, or on the plane of the third reflecting mirror, or behind the third reflecting mirror, in the light path. Further, the upper reflecting mirror may be subjected to a mild diffusion treatment, while maintaining the light converging property. Furthermore, it may be possible that, instead of, or, in combination with, the heat preventing filter or wavelength selecting filter 15, there may be evaporatively deposited on these reflecting mirrors a heat preventing or wavelength selecting coating.

As stated in the foregoing, according to the present invention, there may be provided a slit illuminating device of a compact size which, by broadly illuminating the slit portion with a diverging light beam, does not create any shading portion at the edge of an image original such as the bound portion in a book, or, enables the slit portion to be uniformaly illuminated constantly, even if there occurs displacement in the light source position.

What we claim is:

1. A slit illuminating device, comprising:
(a) a light source;
(b) a lower reflecting mirror partially enclosing said light source, wherein the light reflected by said lower reflecting mirror broadly illuminates the slit with divergent light rays;
(c) an upper reflecting mirror partially enclosing said light source, wherein the light reflected by said upper reflecting mirror is reflected as convergent light rays; and
(d) a third reflecting mirror, said third mirror being positioned on the opposite side of a light path extending from the slit to an image forming element than said light source, wherein the reflected light from said upper reflecting mirror is reflected by said third reflecting mirror to broadly illuminate said slit with divergent light rays.

2. The slit illuminating device as set forth in claim 1, wherein said lower reflecting mirror comprises a plurality of flat mirrors, and an envelope plane joining predetermined points on said flat mirrors forms an elliptic cylindrical surface, the first focus of which is at a position in the vicinity of the center of said light source.

3. The slit illuminating device as set forth in claim 2, wherein the second focus in the elliptic cylindrical surface constituting the envelope is at a position in the vicinity of the center of the slit in the light path.

4. The slit illuminating device as set forth in claim 2, wherein the second focus on the elliptic cylindrical surface constituting the envelope is at the front position of the slit in the light path.

5. The slit illuminating device as set forth in claim 2, wherein said second focus in an elliptic cylindrical surface constituting the envelope is at the rear position of the slit in the light path.

6. The slit illuminating device as set forth in claim 1, wherein said lower reflecting mirror constitutes a part of an elliptic cylindrical surface mirror, the first focus of which is a position in the vicinity of the center of said light source, and the second focus of which is at the front position of the slit in the light path.

7. The slit illuminating device as set forth in claim 2 or 6, wherein said upper reflecting mirror constitutes a part of the elliptic cylindrical surface, the first focus of which is at a position in the vicinity of the center of said light source.

8. The slit illuminating device as set forth in claim 7, wherein the second focus of said upper reflecting mirror is in front of said third reflecting mirror in the light path.

9. The slit illuminating device as set forth in claim 7, wherein the second focus of said upper reflecting mirror is positioned on said third reflecting mirror in the light path.

10. The slit illuminating device as set forth in claim 7, wherein the second focus of said upper reflecting mirror is behind said third reflecting mirror in the light path.

11. The slit illuminating device as set forth in claim 1, wherein said third reflecting mirror is a cylindrical surface mirror.

12. The slit illuminating device as set forth in claim 1, wherein said third reflecting mirror is a flat surface mirror.

13. The slit illuminating device as set forth in claim 1, wherein said light source is a linear light source.

14. The slit illuminating device as set forth in claim 1, wherein said light source is a front light source, the bulb surface of which is a light scattering surface.

15. The slit illuminating device as set forth in claim 1, wherein a heat preventing filter or a wavelength selecting filter is provided at an opening portion in said upper and lower reflecting mirrors in the light path from said light source.

16. The slit illuminating device as set forth in claim 1, wherein a heat preventing filter or a wavelength selecting filter is evaporatively deposited on said reflecting mirrors.

17. The slit illuminating device as set forth in claim 1, wherein said reflecting mirrors are subjected to mild diffusion treatment with light converting property being maintained.

* * * * *

UNITED STATES PATENT AND TRADEMARK OFFICE

CERTIFICATE OF CORRECTION

PATENT NO. : 4,333,130

DATED : June 1, 1982

INVENTOR(S) : NORITAKA MOCHIZUKI, ET AL.

It is certified that error appears in the above-identified patent and that said Letters Patent is hereby corrected as shown below:

Column 1, line 53, "illuminated" should read --illuminate--;
lines 53-54, "deverging" should read --diverging--.
line 54, delete "Patent".

Column 7, line 39, Claim 5, change "said" before "second" to --the--.

Signed and Sealed this

*Third* Day of *May 1983*

[SEAL]

*Attest:*

GERALD J. MOSSINGHOFF

*Attesting Officer* *Commissioner of Patents and Trademarks*